United States Patent [19]

Pagano et al.

[11] Patent Number: 5,106,030
[45] Date of Patent: Apr. 21, 1992

[54] FILM CASSETTE WITH EXPOSURE STATUS INDICATOR

[75] Inventors: Daniel M. Pagano, Henrietta; Stephen H. Miller, Rochester; Thomas D. Jensen, Himrod, all of N.Y.

[73] Assignee: Eastman Kodak Company, Rochester, N.Y.

[21] Appl. No.: 560,947

[22] Filed: Jul. 31, 1990

[51] Int. Cl.⁵ .............................................. G03B 17/26
[52] U.S. Cl. ..................................... 242/71.1; 354/275
[58] Field of Search ........................... 242/71.1, 71.2; 354/275

[56] References Cited

U.S. PATENT DOCUMENTS

| | | | |
|---|---|---|---|
| 2,282,044 | 5/1942 | Fairbanks . | |
| 2,924,158 | 2/1960 | Kopp et al. . | |
| 3,086,862 | 4/1963 | Eagle et al. . | |
| 3,768,894 | 10/1973 | Cook | 352/130 |
| 4,887,110 | 12/1989 | Harvey | 354/275 |
| 4,894,673 | 1/1990 | Beach | 354/275 |
| 4,903,053 | 2/1990 | Harvey | 354/21 |
| 4,978,985 | 12/1990 | Smart et al. | 242/71.1 X |
| 4,987,437 | 1/1991 | Pagano et al. | 242/71.1 X |
| 5,048,770 | 9/1991 | Baxter et al. | 242/71.1 |

Primary Examiner—John M. Jillions
Attorney, Agent, or Firm—Roger A. Fields

[57] ABSTRACT

A film cassette comprises a film spool supported inside a lighttight cassette shell for rotation to thrust a filmstrip coiled about the spool to the exterior of the shell whether the filmstrip is unexposed or is only partly exposed, and a film exposure status indicator supported for movement relative to the shell from an unexposed position to respective partly exposed and fully exposed positions for providing visible indications that the filmstrip is only partly exposed or is substantially exposed. According to the invention, the shell includes respective indicia indicating that the filmstrip is only partly exposed and is substantially exposed and respective windows located proximate the indicia, and the status indicator is configured in relation to the windows to be visible at the window proximate the indicia indicating that the filmstrip is only partly exposed when the indicator is in its partly exposed position and to be visible at the window proximate the indicia indicating that the filmstrip is substantially exposed when the indicator is in its fully exposed position.

9 Claims, 15 Drawing Sheets

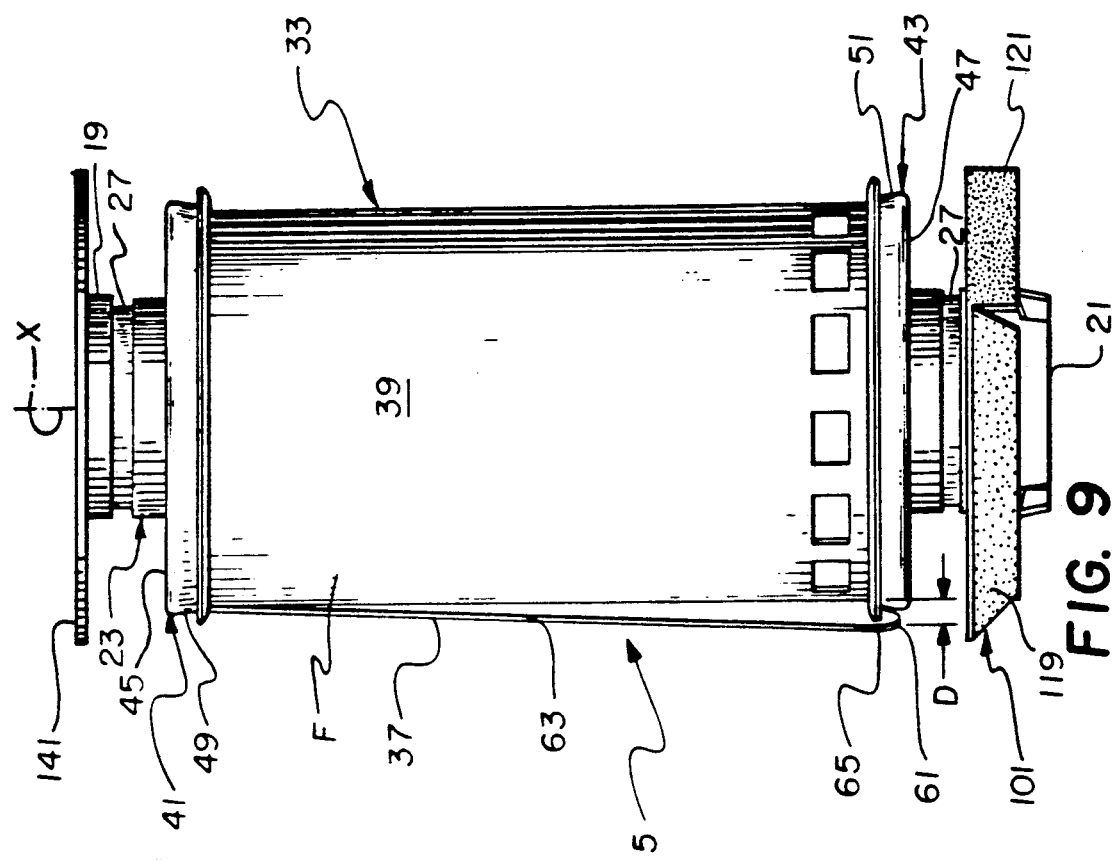
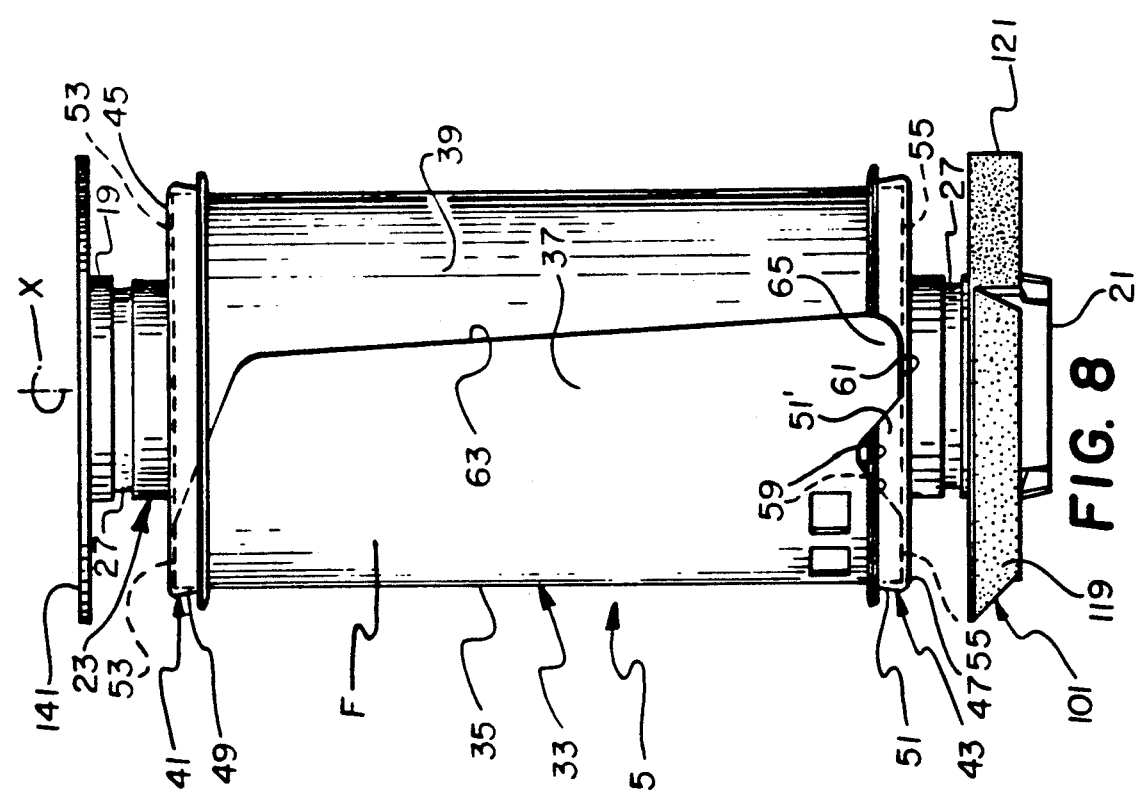

FILM CASSETTE WITH EXPOSURE STATUS INDICATOR

CROSS-REFERENCE TO RELATED APPLICATIONS

Reference is made to commonly assigned copending applications Ser. No. 07/560,921 entitled PHOTOGRAPHIC FILM CASSETTE AND CAMERA APPARATUS AND METHOD and filed July 31, 1990 in the names of David C. Smart and Daniel M. Pagano now U.S. Pat. No. 5,032,854; Ser. No. 07/565,769, entitled FILM CASSETTE WITH LOCK-OUT MEANS FOR PREVENTING LOAD OF EXPOSED FILM and filed Jul. 31, 1990 in the names of Stephen H. Miller et al now U.S. Pat. No. 5,047,794; Ser. No. 07/562,501, entitled FILM CASSETTE WITH BUILT-IN SUPPORT FOR OPTICAL SENSOR TO READ FILM INFORMATION and filed Aug. 2, 1990 in the name of Daniel M. Pagano now U.S. Pat. No. 5,025,274; Ser. No. 07/520,309, entitled FILM CASSETTE WITH FILM EXPOSURE STATUS INDICATOR and filed May 7, 1990 in the names of Stephen H. Miller and Daniel M. Pagano now U.S. Pat. No. 4,987,437; Ser. No. 07/529,287, entitled FILM CASSETTE WITH EXPOSURE STATUS INDICATOR, and filed May 29, 1990 in the names of Dennis E. Baxter and Jeffrey R. Stoneham now U.S. Pat. No. 5,048,770; and Ser. No. 07/436,265, entitled CAMERA APPARATUS FOR PREVENTING LOAD OF EXPOSED FILM, and filed Nov. 14, 1989 in the name of David C. Smart now U.S. Pat. No. 4,994,828.

BACKGROUND OF THE INVENTION

1. Field of the Invention

The invention relates generally to the field of photography, and in particular to a film cassette containing roll film. More specifically, the invention relates to a film cassette having indicator means for informing the photographer that a filmstrip inside the cassette is unexposed, only partly exposed, or substantially exposed.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forward-most portion of the filmstrip approximately 2¾ inches long, commonly referred to as a "film leader", normally protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader is normally non-protruding, i.e. it is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the forward or leading end of the filmstrip is slightly tapered purportedly to allow it to freely extend from between the circumferential lips and rest against the shell wall. During initial unwinding rotation of the film spool, the leading end of the filmstrip is advanced to and through a non-lighttight film passageway in order to exit the cassette shell. As a result, all that is needed to advance the filmstrip out of the cassette shell is to rotate the film spool in the unwinding direction. However, according to U.S. Pat. No. 4,423,943, the film cassette is intended to be loaded in a camera only after the non-protruding leader is advanced out of the cassette shell. In the patent, it is suggested that one manually rotate the film spool relative to the cassette shell until the film leader can be manually grasped and attached to a film advancing device in the camera. Thus, the camera is not used to rotate the film spool to advance the film leader from the cassette shell.

More recently, in U.S. Pat. No. 4,834,306, granted May 30, 1989, U.S. Pat. No. 4,846,418, granted Jul. 11, 1989, U.S. Pat. No. 4,848,693, granted Jul. 18, 1989, U.S. Pat. No. 4,875,638, granted Oct. 24, 1989, U.S. Pat. No. 4,887,110, granted Dec. 12, 1989, U.S. Pat. No. 4,894,673, granted Jan. 16, 1990, and U.S. Pat. No. 4,899,948, granted Feb. 13, 1990, there are disclosed other film cassettes wherein a non-protruding leader is advanced automatically out of the cassette shell responsive to rotation of the film spool in an unwinding direction. In those patents, as compared to U.S. Pat. No. 4,423,943, however, there is no suggestion to manually rotate the film spool to expel the film leader.

In conventional 35 mm film manufacturers cassettes, after the filmstrip is completely exposed, the film spool is rotated in a winding direction to rewind the film leader into the cassette shell. Since the film leader cannot subsequently be advanced out of the cassette shell because of the binding effect that will occur between the film roll and the shell when the film spool is rotated in the unwinding direction, this usually serves as an indication that the filmstrip is completely or partly exposed. Conversely, in the film cassettes disclosed in U.S. Pat. Nos. 4,423,943, 4,834,306, 4,846,418, 4,848,693, 4,875,638, 4,887,110, 4,894,673, and 4,899,948, the film leader can be automatically advanced out of the cassette shell by rotating the film spool in the unwinding direction. This can be done regardless of whether the filmstrip is unexposed, completely exposed, or only partly exposed. Some of the film cassettes disclosed in these patents provide no indication as to the exposure status of the filmstrip, others provide some indication of the exposure status.

3. The Cross-Referenced Applications

The cross-referenced applications each disclose a film cassette capable of advancing a filmstrip automatically out of a light-tight cassette shell whether the filmstrip is unexposed, only partly exposed, or substantially exposed. The film cassette is characterized in that a film exposure status indicator can be disposed in any one of three unique exposure-related positions comprising an unexposed position for providing a visible indication that the filmstrip is unexposed, a partly exposed position for providing a visible indication that the filmstrip is only partly exposed, and a fully exposed position for providing a visible indication that the filmstrip is substantially exposed.

SUMMARY OF THE INVENTION

A film cassette comprises a film spool supported inside a lighttight cassette shell for rotation to thrust a filmstrip coiled about the spool to the exterior of the shell whether the filmstrip is unexposed or is only partly exposed, and a film exposure status indicator supported for movement relative to the shell from an unexposed position to respective partly exposed and fully exposed positions for providing visible indications that the filmstrip is only partly exposed or is substantially exposed. According to the invention, the shell includes respective indicia indicating that the filmstrip is only partly exposed and is substantially exposed and respective windows located proximate the indicia, and the status indicator is configured in relation to the windows to be visible at the window proximate the indicia indicating that the filmstrip is only partly exposed when the indicator is in its partly exposed position and to be visible at the window proximate the indicia indicating that the filmstrip is substantially exposed when the indicator is in its fully exposed position.

BRIEF DESCRIPTION OF THE DRAWINGS

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

The Film Cassette — General

Figure 1:
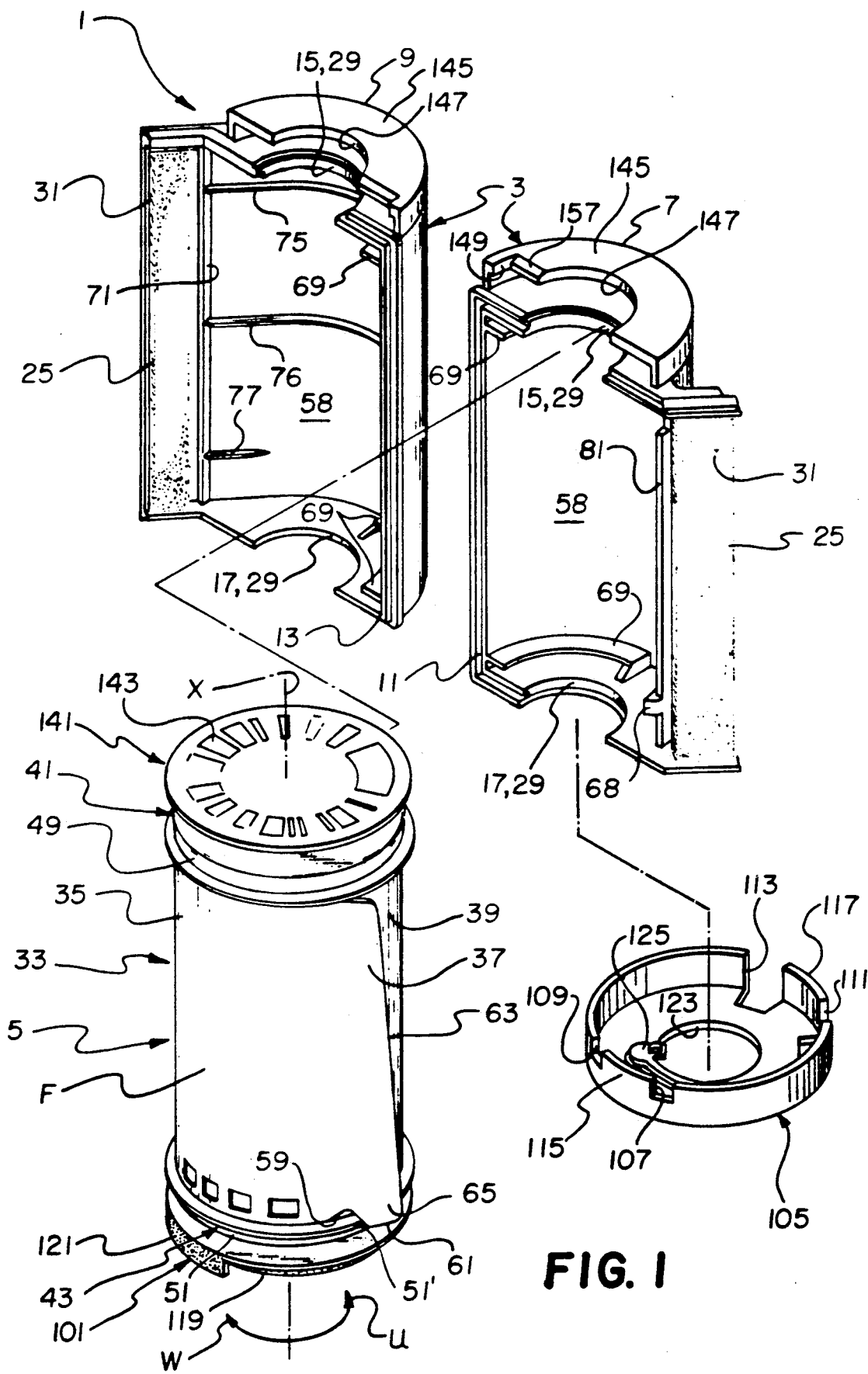
FIG. 1 is an exploded perspective view of a film cassette according to a preferred embodiment of the invention.
Figure 2:
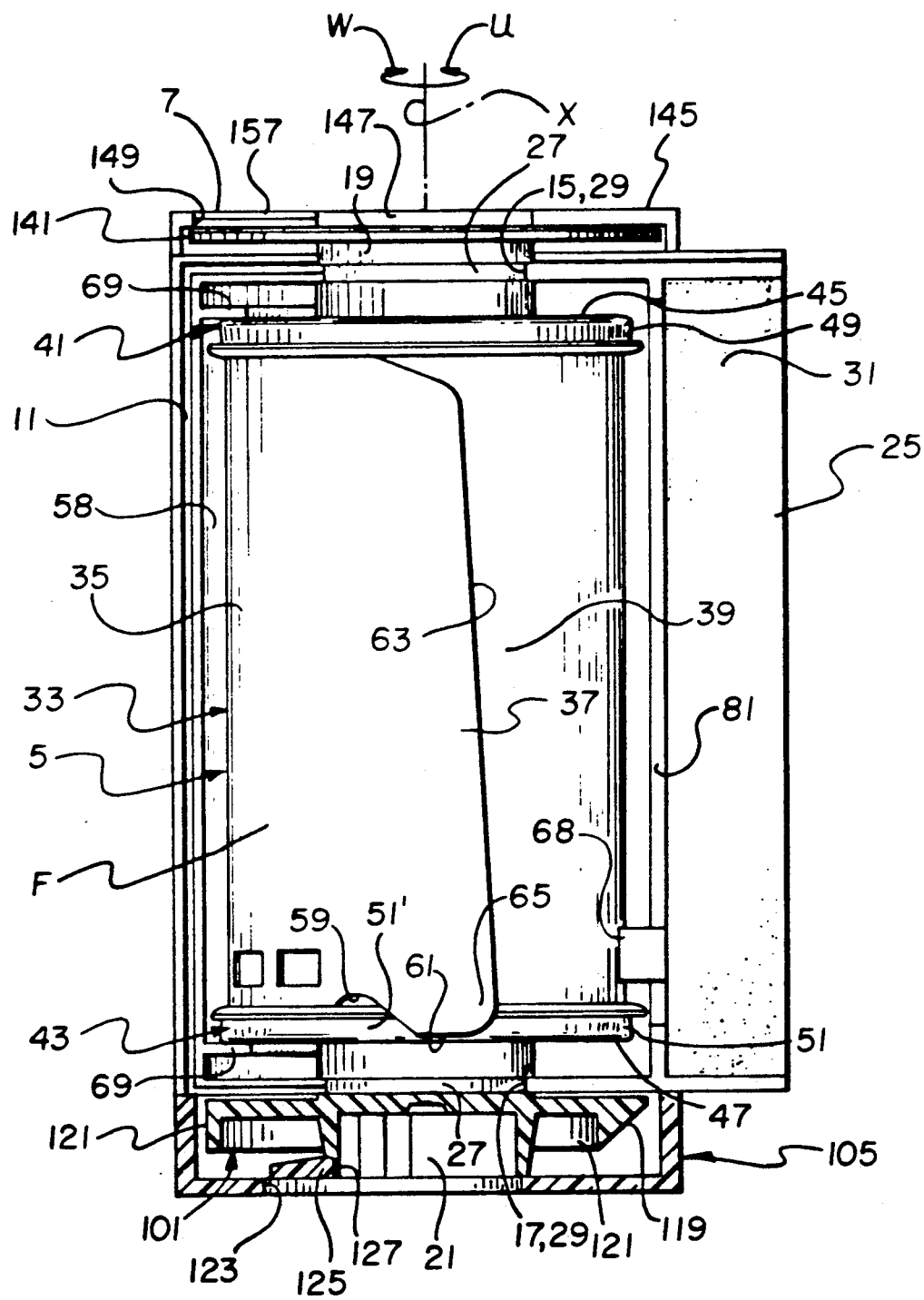
FIG. 2 is an elevation view of the film cassette, illustrating the cassette shell open to reveal a film roll coiled about a film spool.
Figure 12:
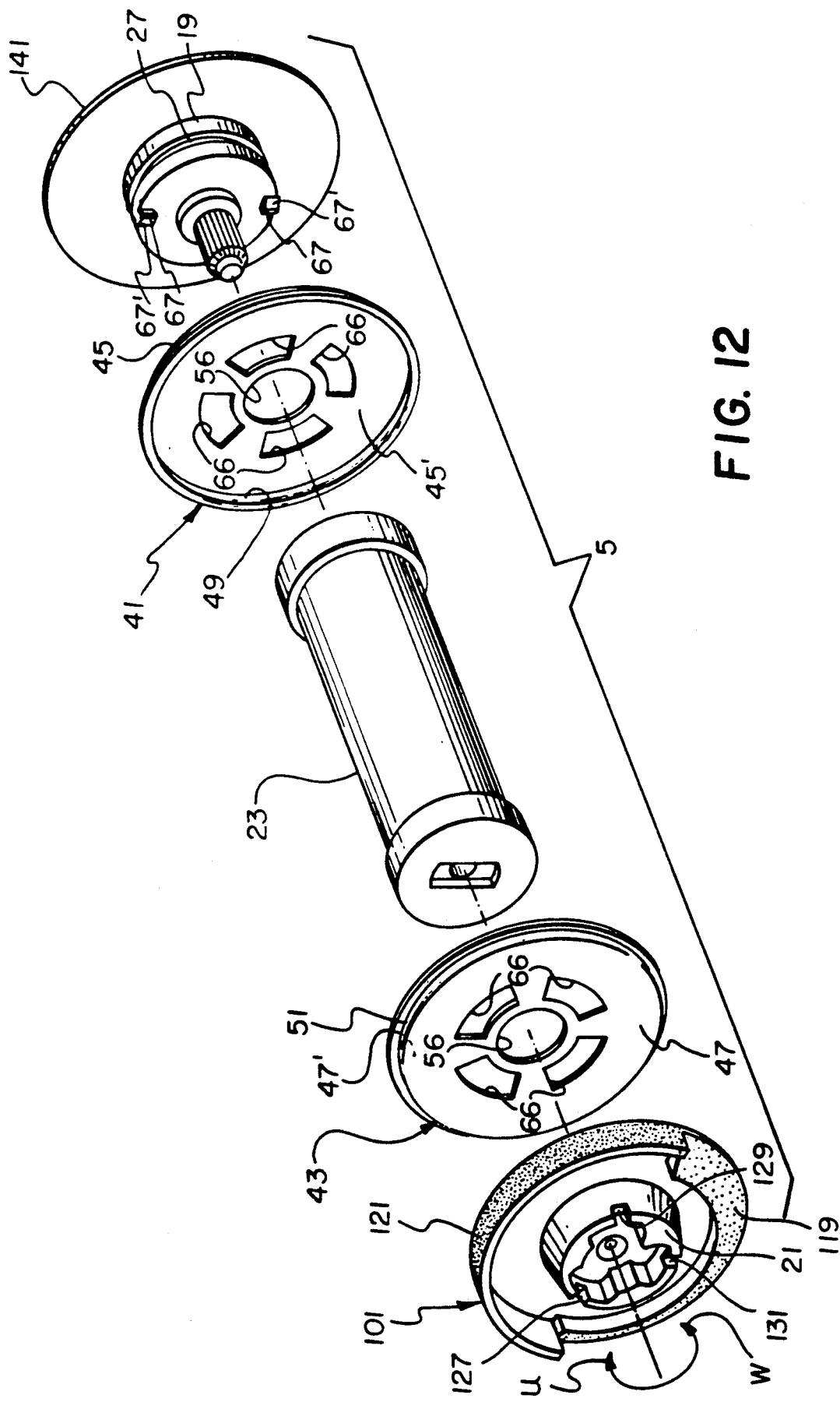
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for a relatively shorter end piece 19 and a longer opposite open-end piece 21 of a spool core or hub 23, and they define a narrow relatively-straight film passageway 25 to the exterior of the cassette shell 3. The shorter end piece 19 and the longer open-end pieces 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
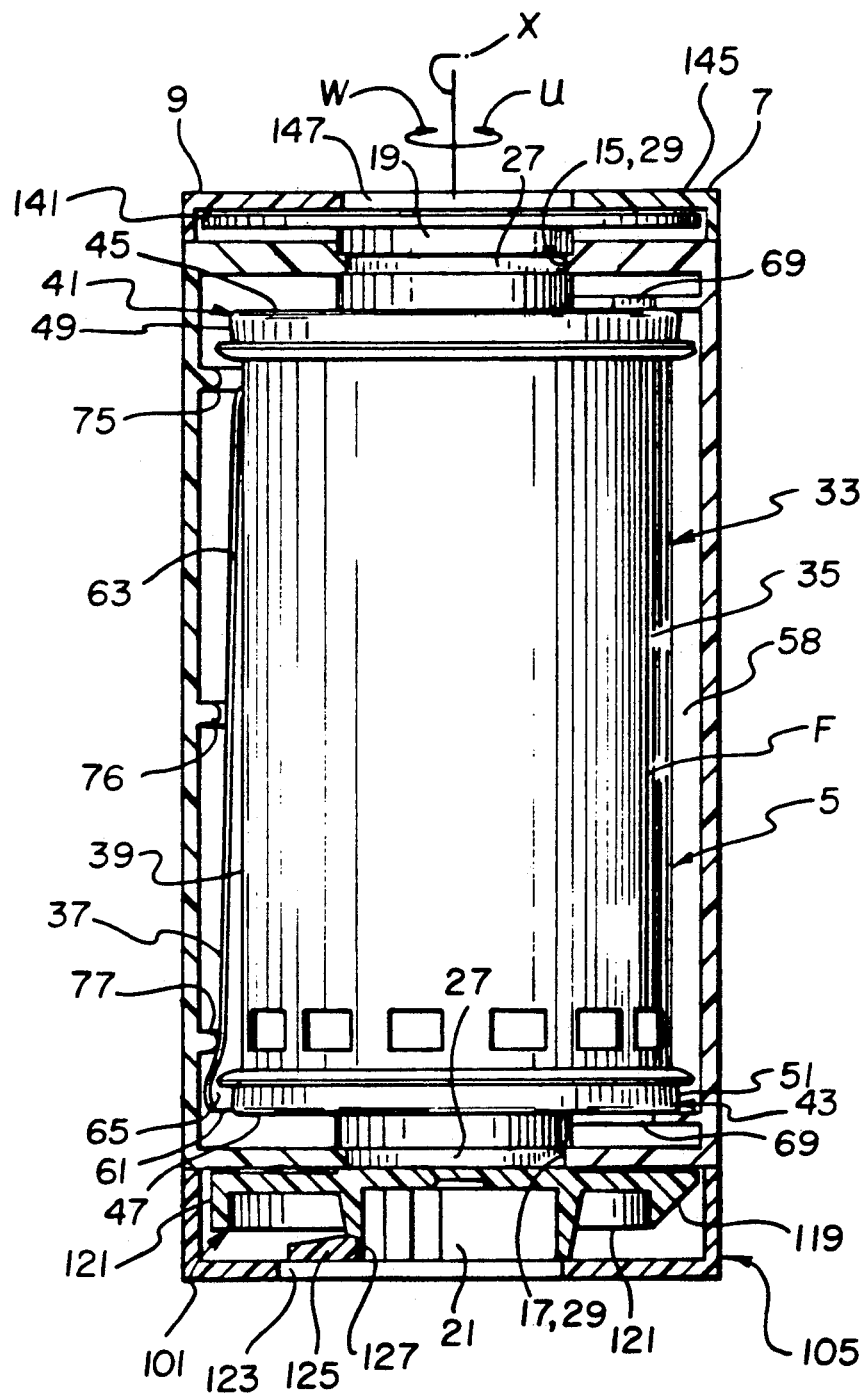
FIG. 3 is an elevation view similar to FIG. 2, through partly in section.
Figure 13:
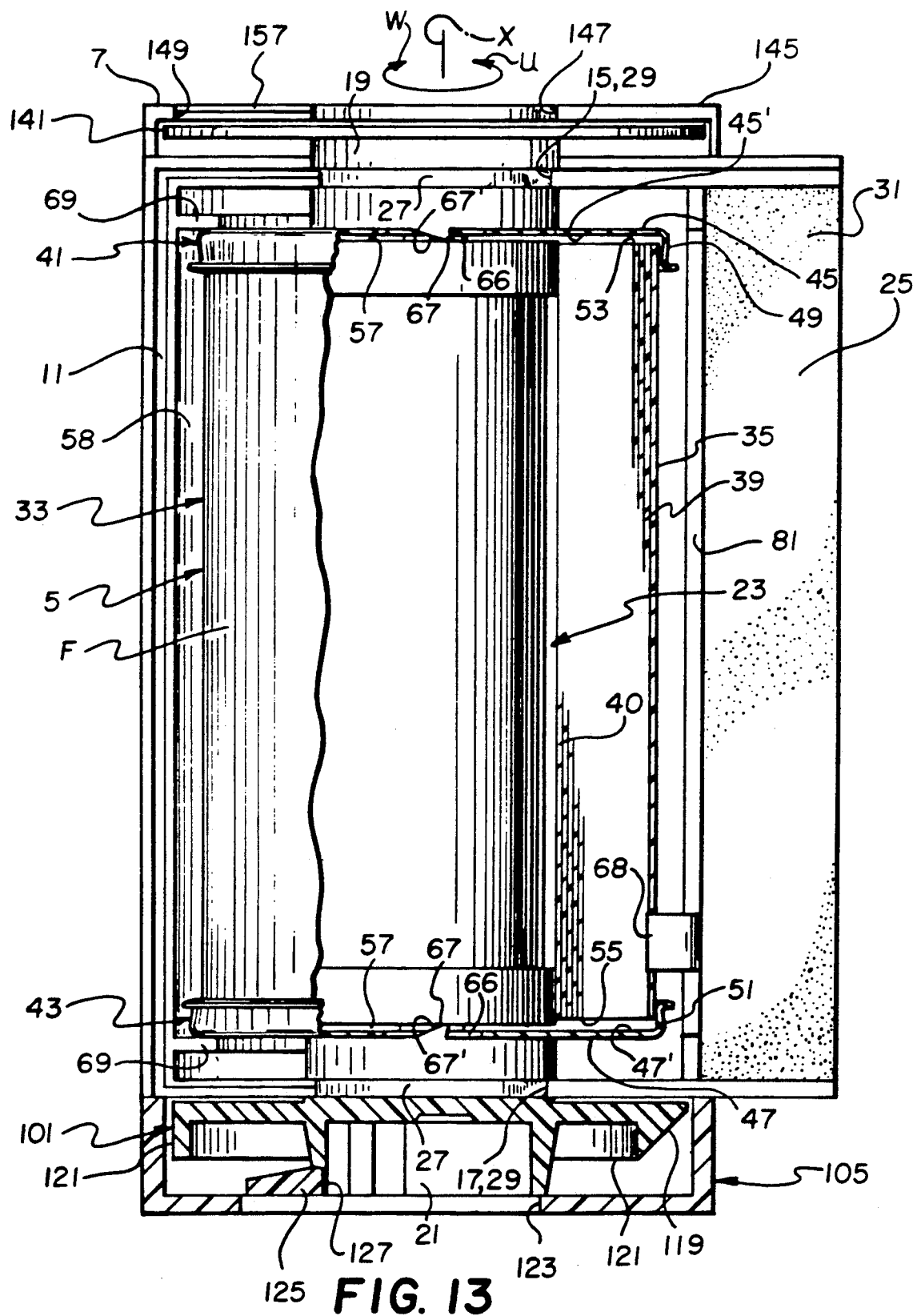
FIG. 13 is an elevation view partly in section of the film roll and the film spool, illustrating the manner in which one of a pair of film confining flanges of the spool may be fixed to the spool for concurrent rotation with the spool.

A roll 33 of 35 mm filmstrip F is coiled about the spool core 23 to form successive film convolutions. As shown in FIGS. 2 and 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. See FIGS. 12 and 13. Respective circumferential gaps 57 are provided in the spool core 23 for supporting the flanges 41 and 43 at their disks 45 and 47 to permit the flanges to be independently rotated about the axis X. The two gaps 57 are sufficiently spaced from one another along the spool core 23 to maintain respective inner faces 45' and 47' of the disks 45 and 47 slightly spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3. A lip-receiving notch 59 is cut in the film leader (outermost convolution) 35 along its longitudinal edge 55, relatively close to its leading end 37, to receive a peripheral section 51' of the annular lip 51. This allows a relatively short edge-section 61 of the film leader (outermost convolution) 35 connecting the leading end 37 and the notch 59 to overlap the annular lip 51 radially outwardly to thus maintain the leading end spaced a radial distance D from the next-inward convolution 39 of the film roll 33. See FIGS. 4 and 9. The leading end 37 has a forward edge 63 inclined from the longitudinal edge 53 of the film leader (outermost convolution) 35 to the other longitudinal edge 55 of the leader to form a forward-most tip or tab 65 of the leader which, like the edge-section 61, overlaps the annular lip 51 radially outwardly. See FIGS. 1, 2, 8 and 9.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the shorter and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12 and 13. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

Figure 4:
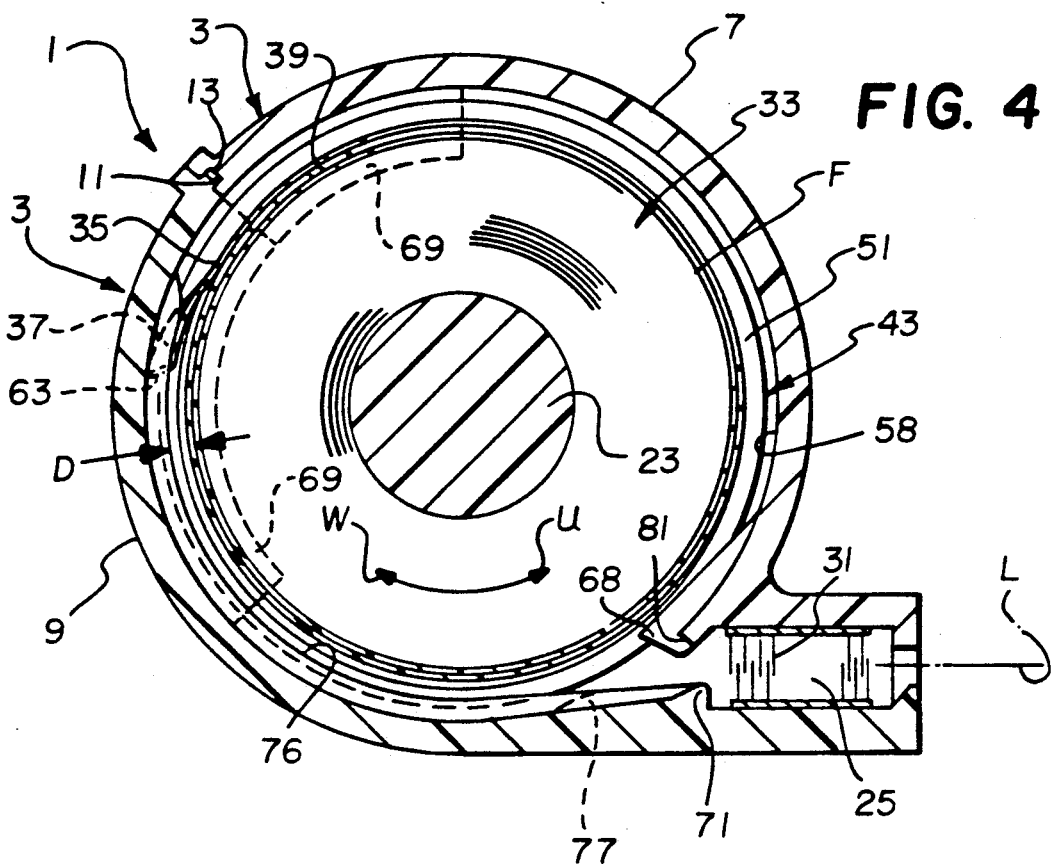
FIG. 4 is an end view partly in section of the cassette shell, the film roll and the film spool, illustrating the manner in which the film roll is originally stored on the film spool.
Figure 5:
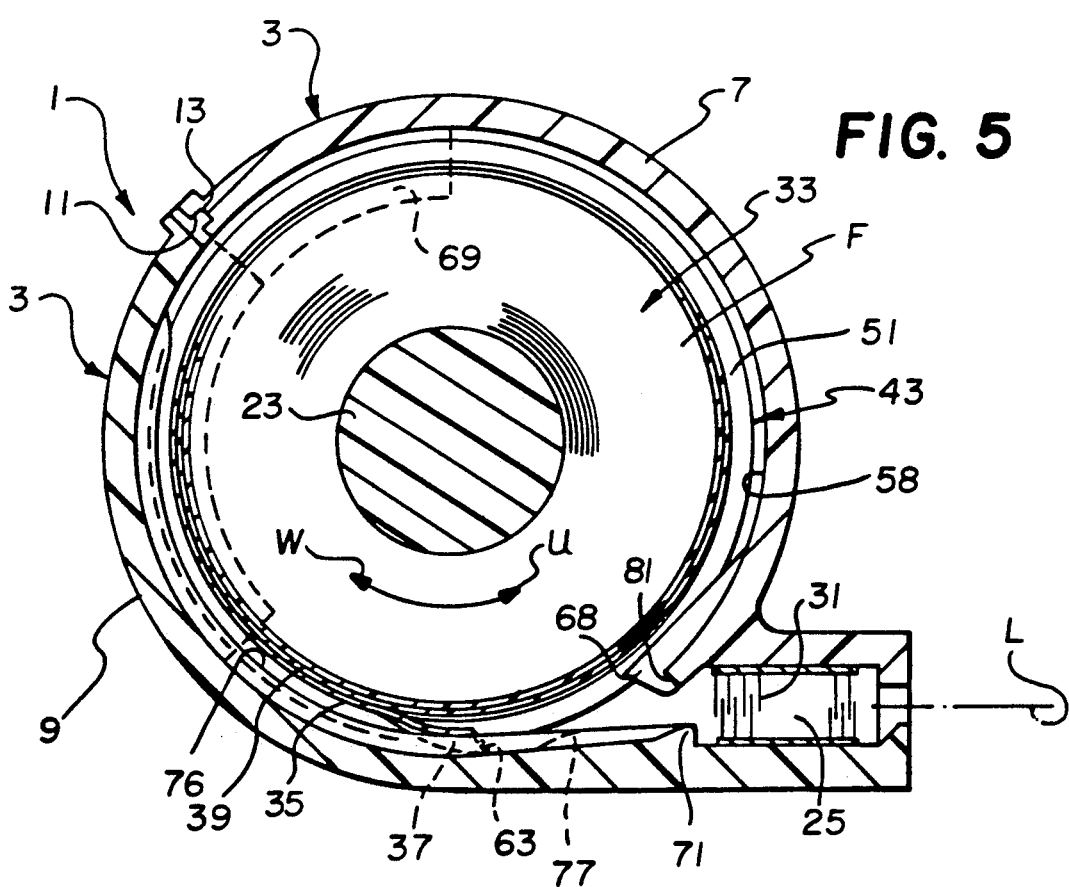
FIGS. 5, 6, and 7 are end views similar to FIG. 4, illustrating the manner in which the film roll is unwound from the film spool.

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the forward-most tip 65 of the leader, to pick up the leading end and guide it into the film passageway responsive to rotation of the spool core 23 in the unwinding direction U. See FIGS. 1 and 4-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
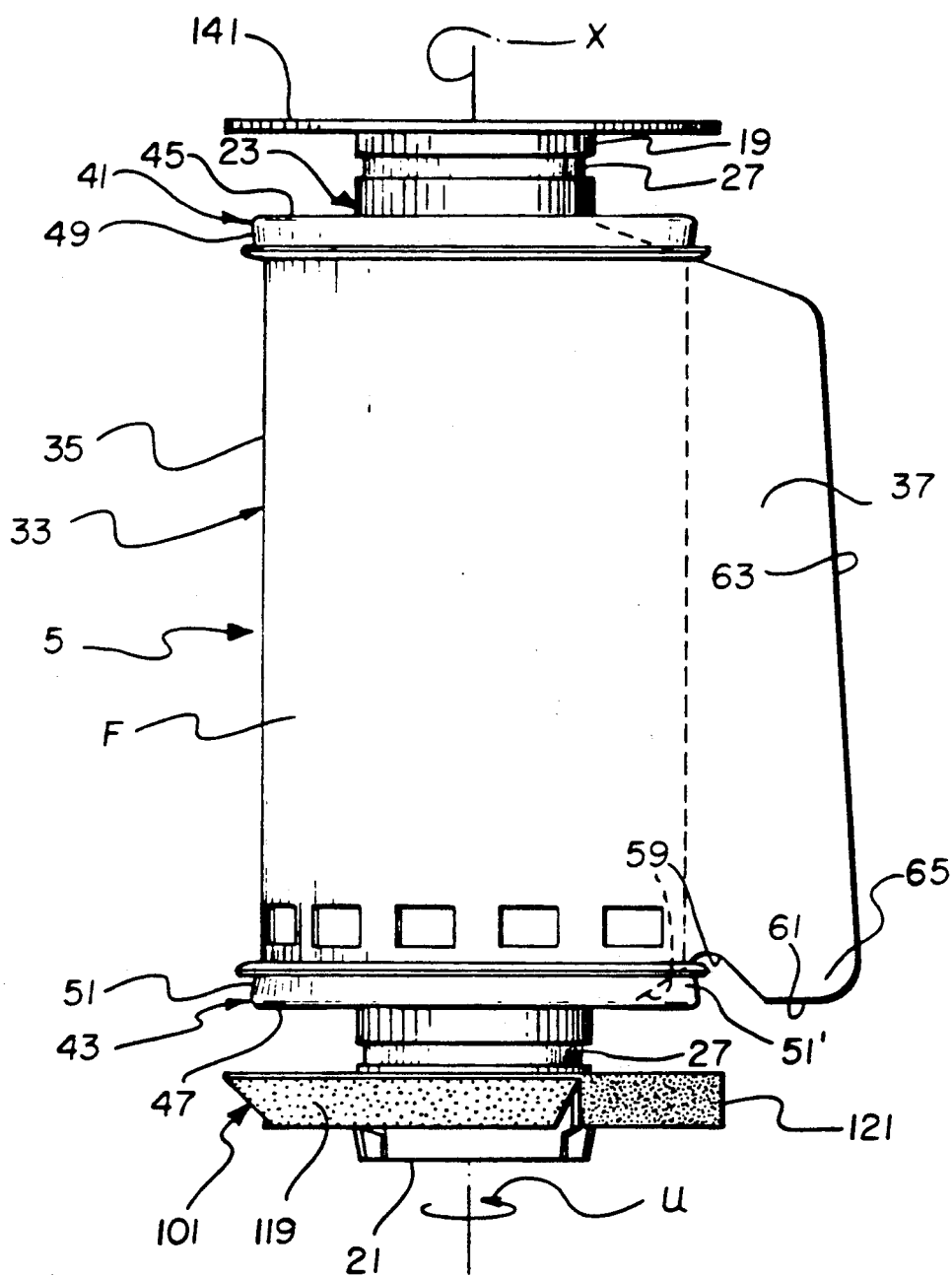
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 53 and 55 of the leader start to gently flex respective arcuate portions of the two flanges 41 and 43 away from one another, i.e. farther apart, first to allow the notch 59 to separate from the lip section 51', and then to allow successive longitudinal sections of the leader to uncoil from between the flanges and exit to the outside of the cassette shell 3. See FIGS. 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line. Preferably, the film-supporting tip or longitudinal edge of the flattening rib 71 is spaced 0.005"–0.030" short of the center line L.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

Figure 6:
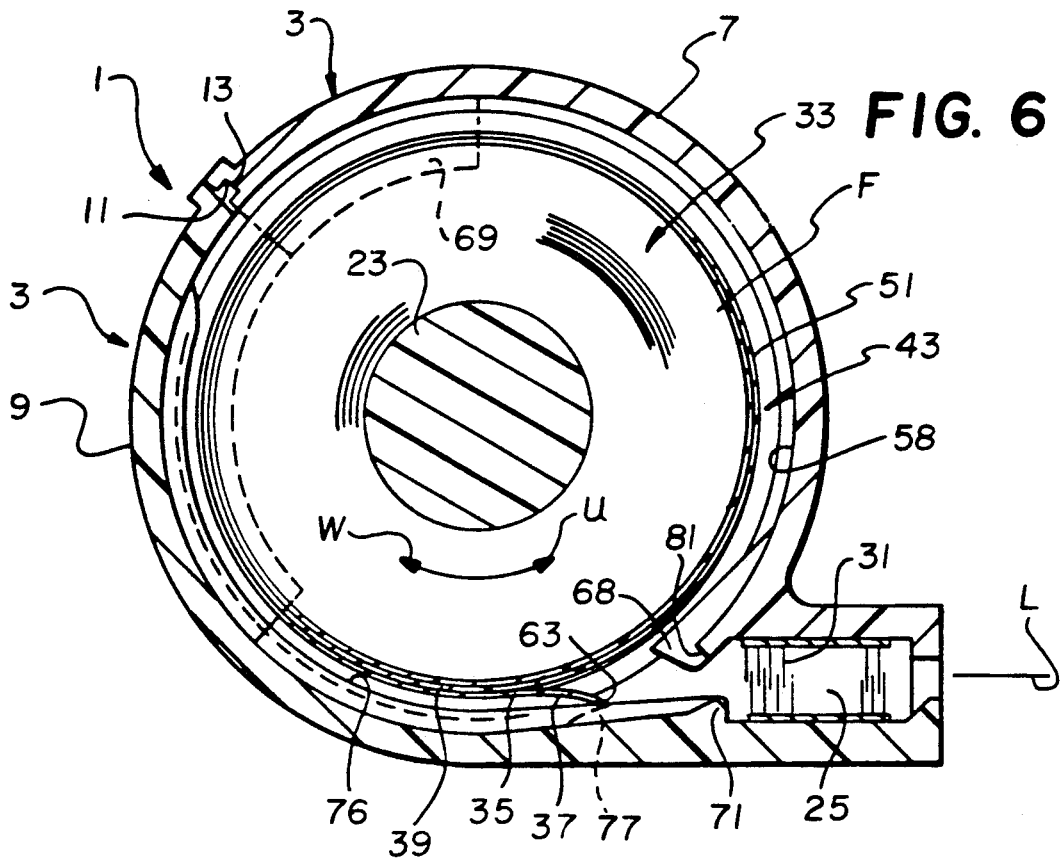
Figure 7:
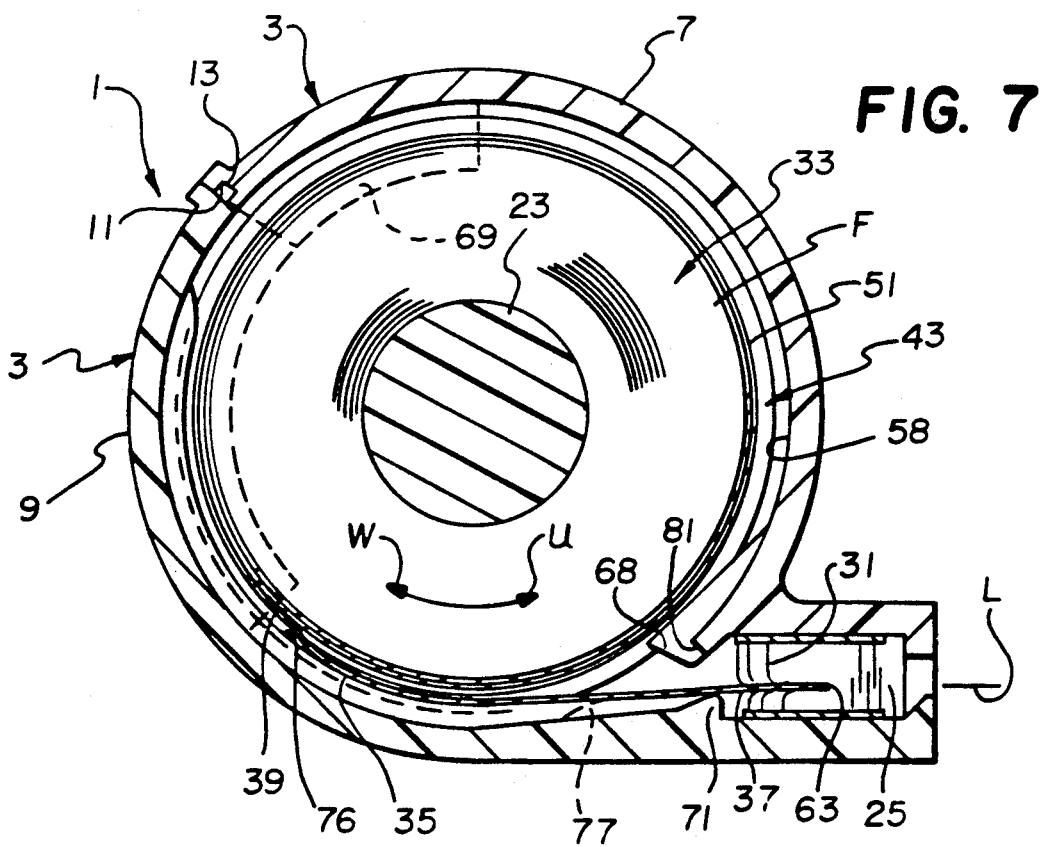
Figure 11:
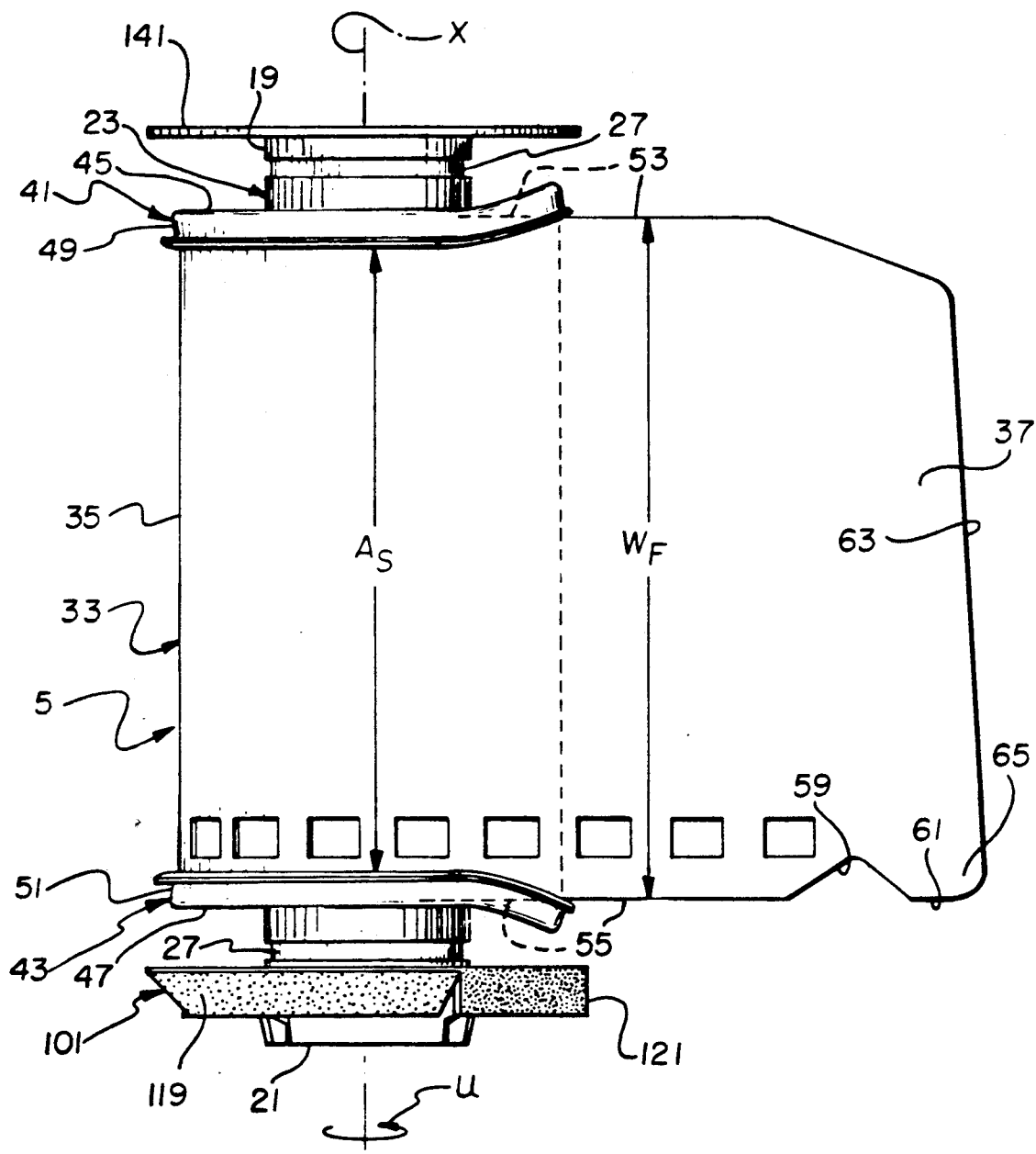

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally however, before the film roll 33 can be expanded radially to the extent a non-slipping relation would be created between the film leader (outermost convolution) 35 and the annular lips 49 and 51 as in cited U.S. Pat. Nos. 4,834,306 and No. 4,848,693, the hook-like members 67 will have moved along the respective slots 66 into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notch 59 to separate from the lip section 51', and then it allows successive longitudinal sections of the film leader 35 to exit from between the flanges to the outside of the cassette shell 3. Since the stripper-guide 68 initially picks up the leading end 37 of the film leader 35 close to its forward-most tip 65, the forward edge 63 of the leading end will move against the film flattening rib 71 as shown in FIG. 6.

When the film leader 35 is thrust through the film passageway 25 to the outside of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 might uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

The Film Exposure Status Indicator/Lock-Out Means Of The Film Cassette

Figure 14:
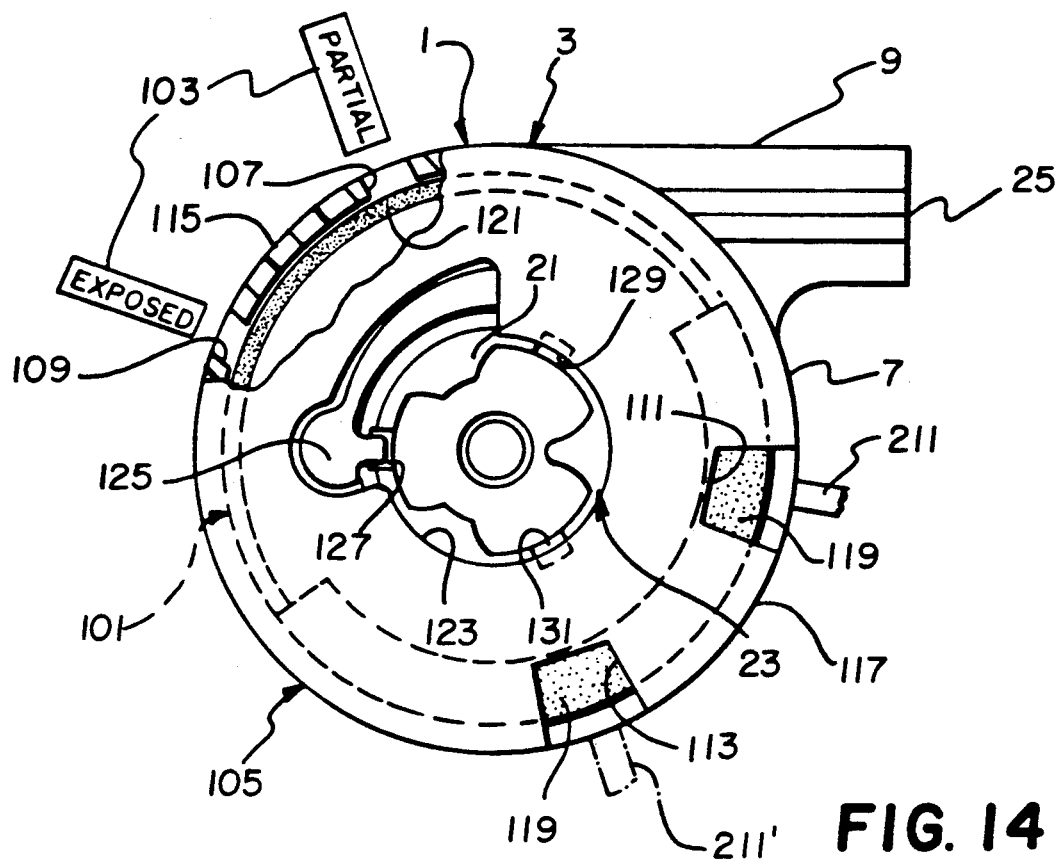
FIG. 14 is an end view of the film cassette, illustrating a film exposure status indicator in an unexposed position.
Figure 15:
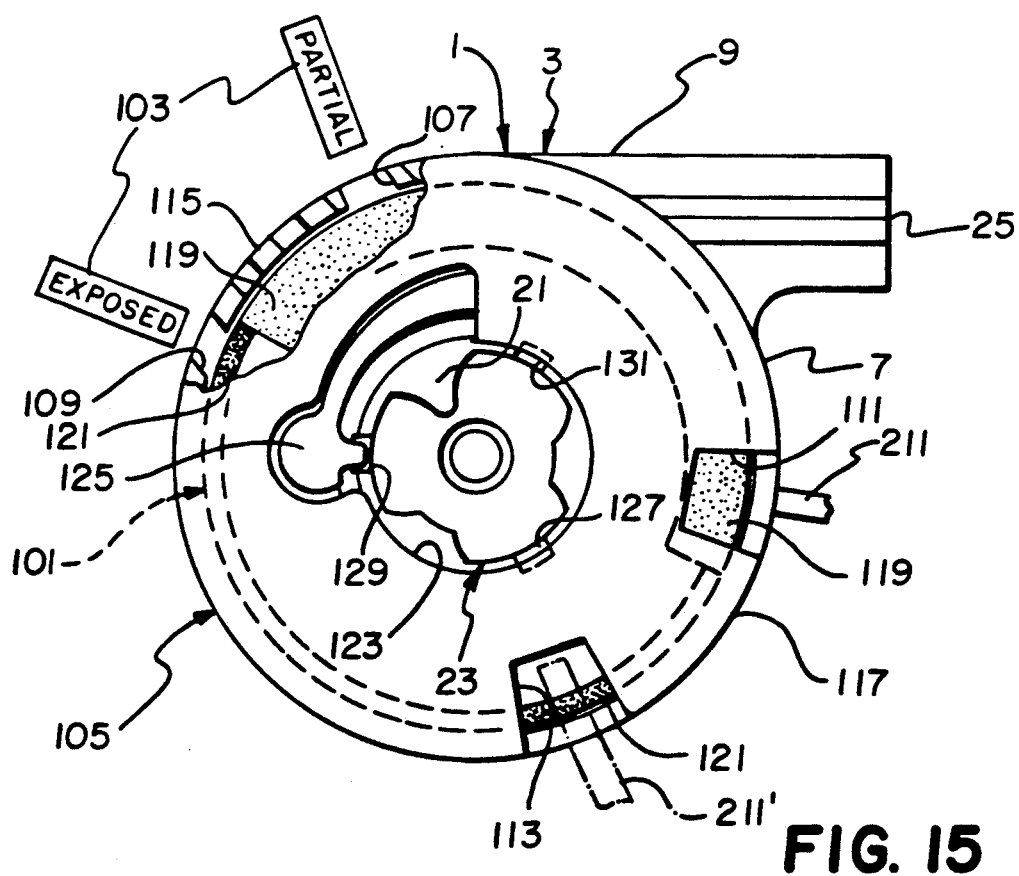
FIGS. 15 and 16 are end views similar to FIG. 14, illustrating the status indicator moved to partly exposed and fully exposed positions, respectively.
Figure 16:
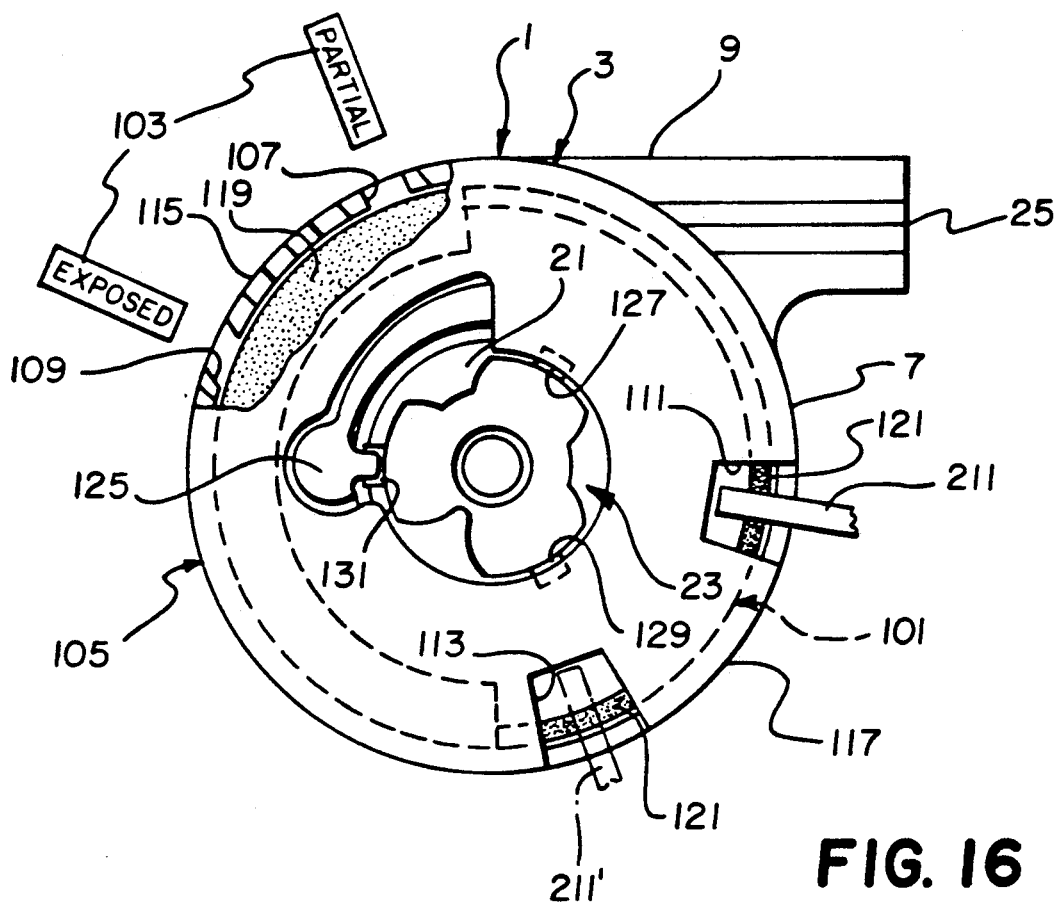

FIGS. 2, 3, 12 and 13 depict a film exposure status indicator/lock-out means 101 integrally formed with the longer open-end piece 21 of the spool core 23. Respective indicia "PARTIAL" and "EXP" indicating that the filmstrip F is only partly exposed, i.e. only some of the available film frames are exposed, and is substantially exposed, i.e. all of the film frames are exposed, are printed on a label 103 adhered to the cassette half 9. See FIGS. 14 and 17. An end cap 105 comprising part of the cassette shell 3 covers the indicator/lock-out means 101. The end cap 105 has respective circumferential indicator windows 107 and 109 aligned with the two indicia "PARTIAL" and "EXP" and has separate lock-out windows 111 and 113. The indicator windows 107 and 109 are spaced apart via an arcuate side portion 115 of the end cap 105, and the lock-out windows 111 and 113 are spaced apart via an arcuate side portion 117 of the end cap. The indicator lock-out means 101 includes an arcuate beveled-edge indicator portion 119 and an arcuate rib-edge lock-out portion 121 having contrasting colors such as red and green. When the indicator/lock-out means 101 is rotationally oriented relative to the end cap 105 as shown in FIG. 14, it is in an unexposed position in which the beveled-edge indicator portion 119 is at the lock-out windows 111 and 113 and the rib-edge lock-out portion 121 is at the indicator windows 107 and 109. At this time, the filmstrip F stored inside the cassette shell 3 is unexposed. When the indicator/lock-out means 101 is rotationally oriented relative to the end cap 105 as shown in FIG. 15, it is in a partly exposed position in which the beveled-edge indicator portion 119 is at the lock-out window 111 and the indicator window 107 and the rib-edge lock-out portion 121 is at the lock-out window 113 and the indicator window 109. At this time, the filmstrip F stored inside the cassette shell 3 is partly exposed. When the indicator/lock-out means 101 is rotationally oriented relative to the end cap 105 as shown in FIG. 16, it is in a fully exposed position in which the beveled-edge indicator portion 119 is at the indicator windows 107 and 109 and the rib-edge lock-out portion 121 is at the lock-out windows 111 and 113. At this time, the filmstrip F stored inside the cassette shell 3 is substantially exposed.

The end cap 105 has a central opening 123 aligned with the longer open-end piece 21 of the spool core 23, and has an integrally formed resilient locking pawl 125 for releasably engaging the longer open-end piece at respective notches or detents 127, 129 and 131 cut in the longer open-end piece. When the indicator/lock-out means 101 is in its unexposed position as shown in FIG. 14, the locking pawl 125 releasably engages the longer open-end piece 21 at the notch 127. When the indicator/lock-out means 101 is in its partly exposed position as shown in FIG. 15, the locking pawl 125 releasably engages the longer open-end piece 21 at the notch 129. When the indicator lock-out means 101 is in its fully exposed position as shown in FIG. 16, the locking pawl 125 releasably engages the longer open-end piece 21 at the notch 131. Thus, the spool core 23 can be rotationally arrested with the indicator/lock-out means in any one of the unexposed, partly exposed and fully exposed positions.

The Film Information Disk Of The Film Cassette

A film information disk 141 is coaxially fixed to the shorter end piece 19 of the spool core 23. See FIGS. 1, 2, 12 and 21. The information disk 141 has an annular array of optically readable information comprising a bar code 143 consisting essentially of a series of radially arranged photoreflective and non-reflective bits. Details of the bar code and its relation to the indicator/lock-out means 101 are disclosed in cross-referenced application Ser. No. 07/560,921.

Figure 21:
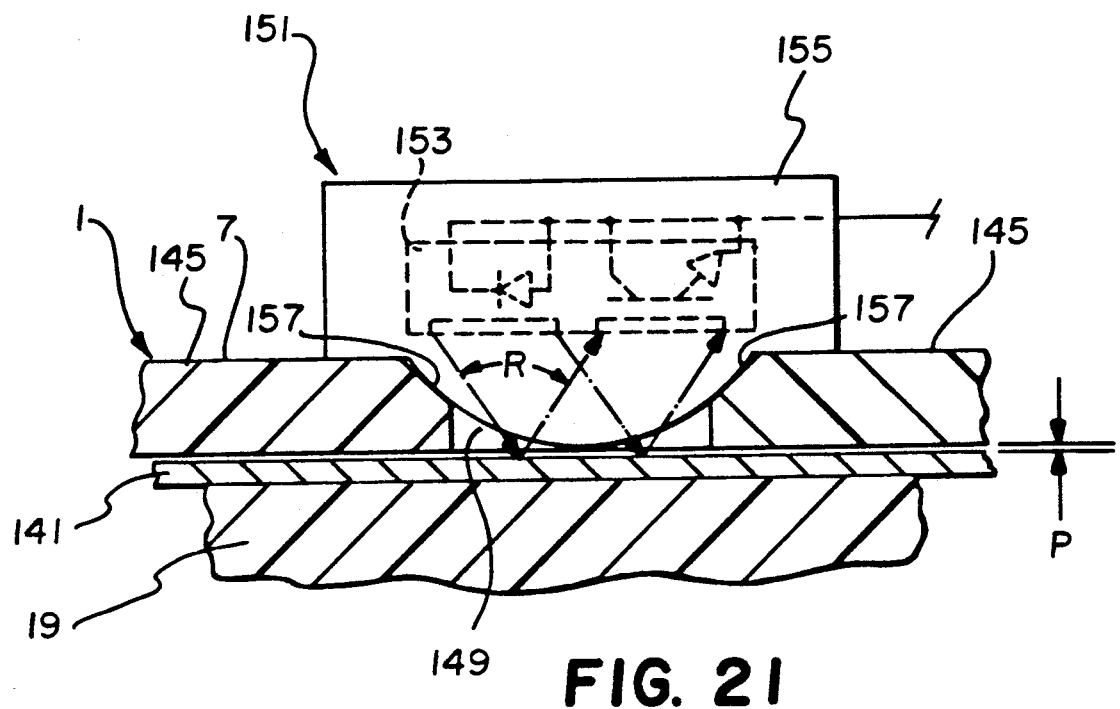
FIG. 21 is a schematic view partly in section of a viewing aperture in the film cassette and camera apparatus including an optical sensor for reading at the viewing aperture a bar code fixed to the film spool.

An end shroud 145 comprising part of the cassette shell 3 covers the information disk 141 except at a central opening 147 and a viewing aperture 149. The central opening 147 allows one to eye-read or machine-read certain information (not shown) such as film speed, the total number of available film frames, etc., printed on the information disk 141. The viewing aperture 149 is dimensioned to access one of the photoreflective or non-reflective bits at a time as the information disk 141 is rotated with the spool core 23 in the winding direction W, and is located a predetermined distance P, e.g. 1 mm, from the disk to establish a substantially optimal angle of reflection R, e.g. 80°; for a photoreflective type optoelectronic sensor 151 positioned at the viewing aperture as shown in FIG. 21 when the film cassette is loaded into a photographic camera including the optoelectronic sensor. The optoelectronic sensor 151 comprises a commercially available, compact, reflective photomicrosensor 153 such as OMRON EE-SY120/-SY121/-SY122, manufactured by Omron Tateisi Electronics Co., Osaka Japan, or SHARP GP2504/GP2506/GP2507, GP 2509/GP2510, manufactured by Sharp Corporation, Osaka Japan, and a special mount or holder 155 for the photosensor. The special mount 155 is adapted to fit into the viewing aperture 149 to be cradled at beveled edges 157 of the viewing aperture.

Camera Apparatus

Figure 17:
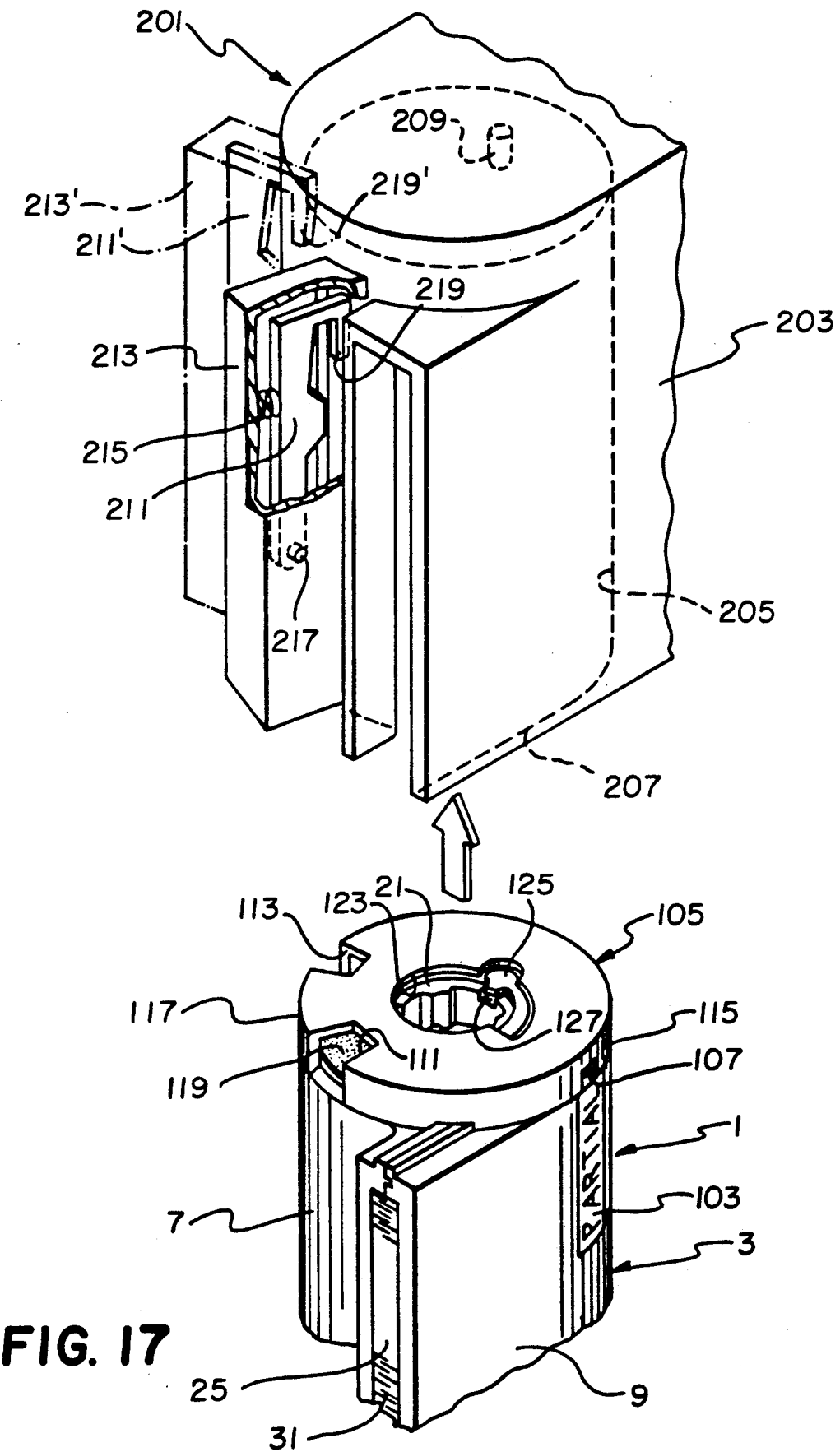
FIG. 17 is a perspective view of the film cassette and camera apparatus including respective sensing/blocking members that cooperate with the status indicator to prevent loading of the cassette into a loading chamber when the status indicator is in its partly exposed and fully exposed positions or only in its fully exposed position.
Figure 19:
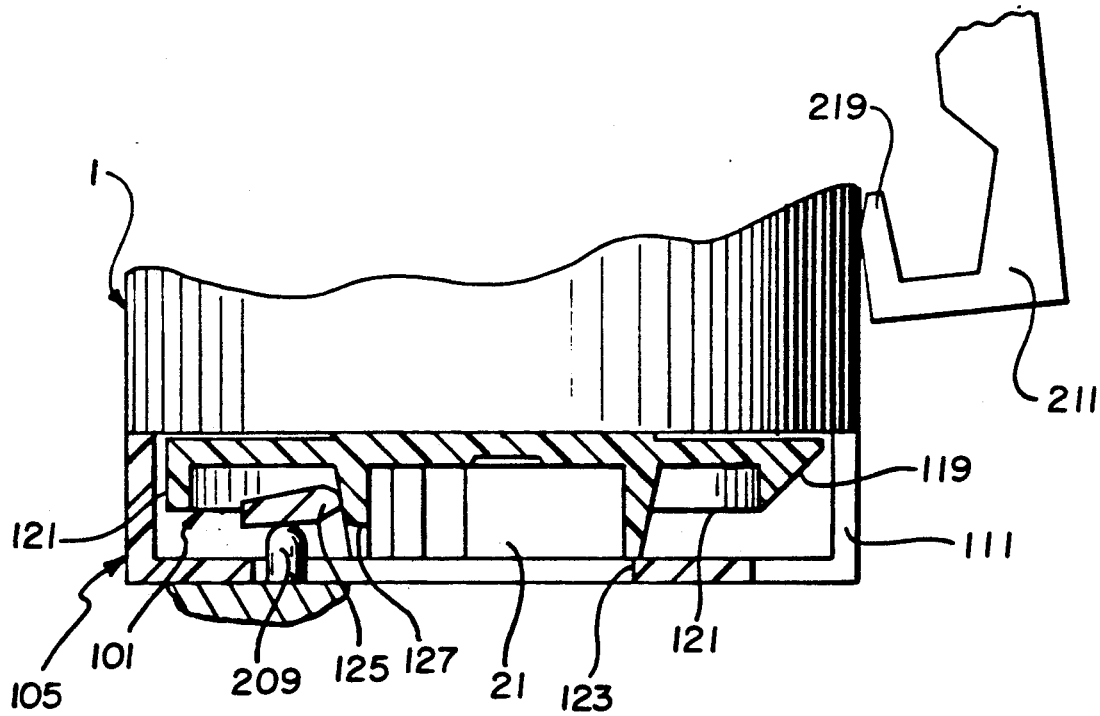

Camera apparatus 201 is shown in FIG. 17 for use with the indicator/lock-out means 101 of the film cassette 1. The camera apparatus 201 includes a camera body 203 having a loading chamber 205 with an entry opening 207 for receiving the film cassette 1 endwise into the chamber. A release pin 209 is located at the bottom of the loading chamber 203 for receipt in the central opening 123 of the end cap 123 to displace the locking pawl 125 from either of the notches 127 or 129. The notches 127 and 129 preferably are beveled along their bottom edges to facilitate displacement of the locking pawl 125 from the notches. See FIG. 19. Thus, the indicator/lock-out means 101 will be permitted to rotate with the spool core 23 in the unwinding direction W from the unexposed position shown in FIG. 14 to the partly exposed position shown in FIG. 15 and from the partly exposed position to the fully exposed position shown in FIG. 16.

Figure 20:
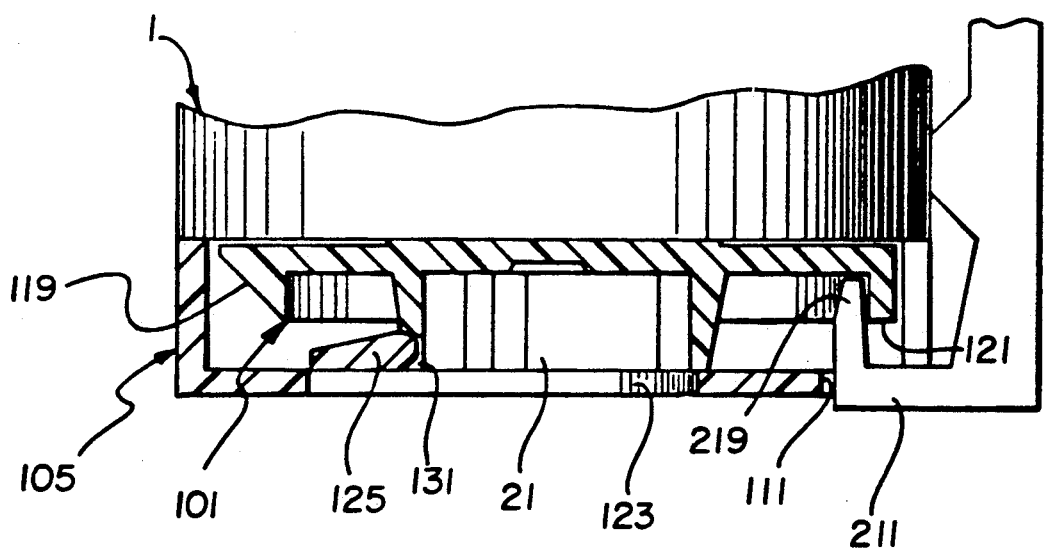
FIG. 20 is a schematic view similar to FIG. 19 illustrating interaction of the sensing/blocking members and the status indicator when the status indicator is in its fully exposed position.
Figure 18:
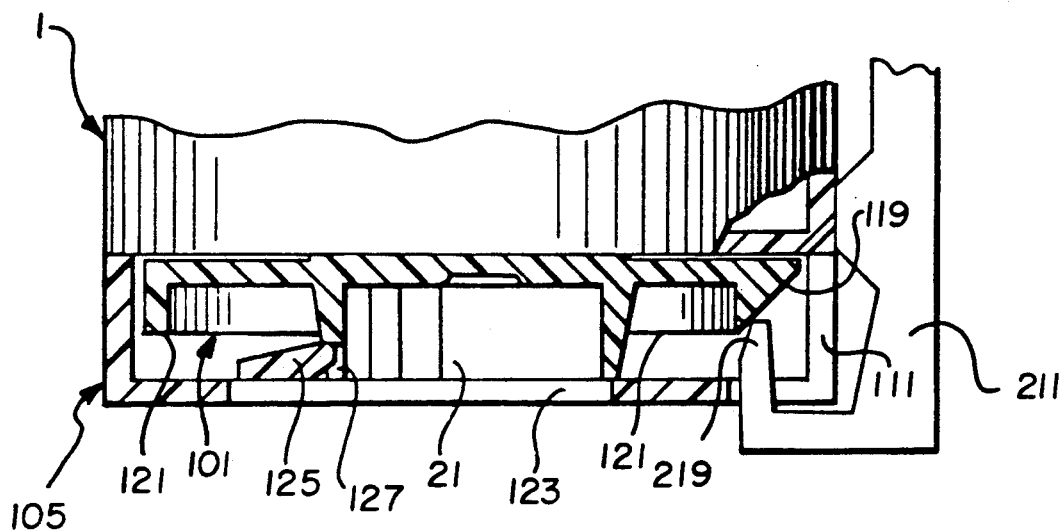
FIGS. 18 and 19 are schematic views partly in section illustrating interaction of the sensing/blocking members and the status indicator when the status indicator is in its unexposed position.

A sensing/blocking member 211 located within a slot 213 opening into the loading chamber 205 is urged by a helical compression spring 215 to pivot clockwise in FIG. 17 about a support pin 217 until a hook-like end 219 of the sensing/blocking member protrudes into the loading chamber. In this normal position, the sensing/blocking member 211 is disposed to locate its hook-like end 219 for abutment with the beveled-edge indicator portion 119 or the rib-edge lock-out portion 121 at the lock-out window 111 in the end cap 105. See FIGS. 14–16. If the film cassette 1 is initially inserted into the loading chamber 205, with the indicator/lock-out means 101 in its unexposed or partly exposed position as shown in FIGS. 14 and 15, the beveled-edge indicator portion 119 at the lock-out window 111 will contact the hook-like end 219 of the sensing/blocking member 211 to cam or pivot the latter member out of the way of the beveled-edge indicator portion to allow the film cassette to be further inserted into the loading chamber. See FIGS. 18 and 19. However, should the film cassette 1 be initially inserted into the loading chamber 205, with the indicator/lock-out means 101 in its fully exposed position as shown in FIG. 16, the rib-edge lock-out portion 121 at the lock-out window 111 will be caught by the hook-like end 219 of the sensing/blocking member 211 to prevent further insertion of the film cassette into the loading chamber. See FIG. 20. Thus, camera apparatus with the sensing/blocking member 211 is intended to receive the film cassette 1 with fresh unexposed or partly exposed film.

An alternate embodiment of the sensing/blocking member 211 is shown in FIG. 17. In this embodiment, the reference numbers 211', 213', and 219' correspond to the reference numbers 211, 213 and 219. If the film cassette 1 is initially inserted into the loading chamber 205, with the indicator/lock-out means 101 in its unexposed position as shown in FIG. 14, the beveled-edge indicator portion 119 at the lock-out window 113 will contact the hook-like end 219' of the sensing/blocking member 211' to cam or pivot the latter member out of the way of the beveled-edge indicator portion to allow the film cassette to be further inserted into the loading chamber. However, should the film cassette 1 be initially inserted into the loading chamber 205, with the indicator/lock-out means 101 in its partly exposed or fully exposed position as shown in FIGS. 15 and 16, the rib-edge lock-out portion 121 at the lock-out window 113 will be caught by the hook-like end 219' of the sensing/blocking member 211' to prevent further insertion of the film cassette into the loading chamber. Thus, camera apparatus with the sensing/blocking member 211' is intended to receive the film cassette 1 only with fresh unexposed film.

Figure 22:
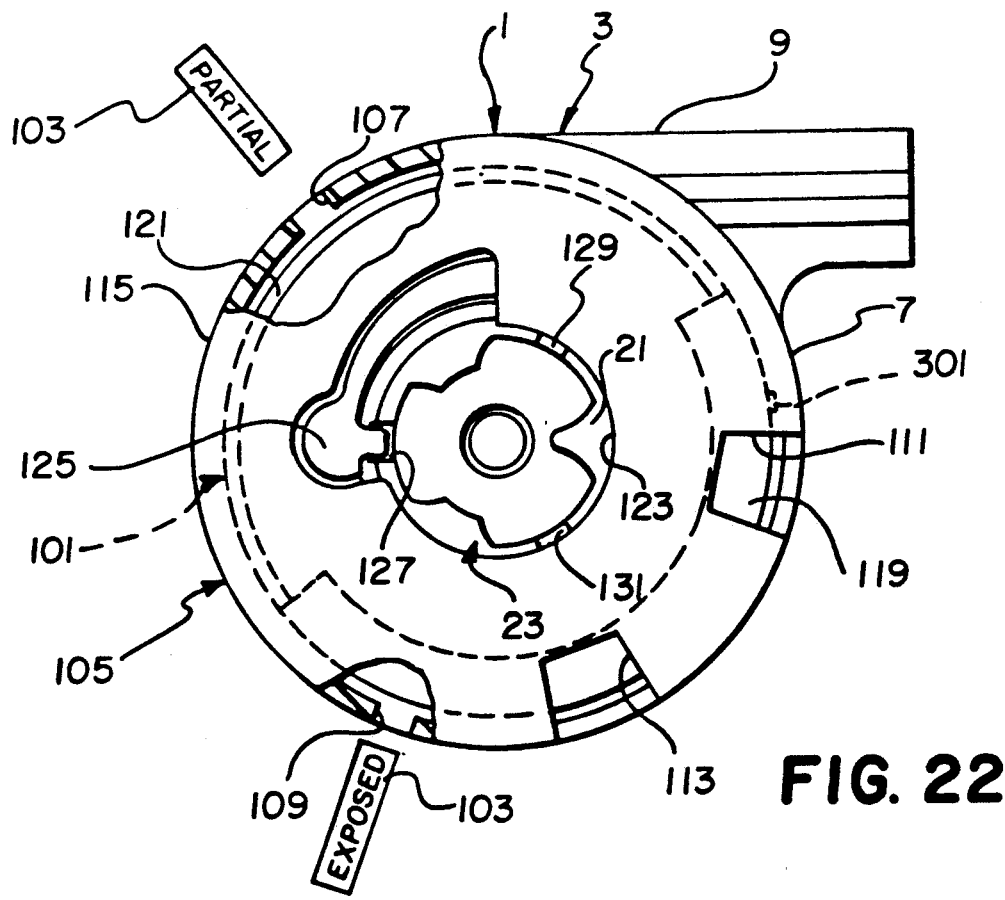
FIG. 22 is an end view of the film cassette including an alternate embodiment of the status indicator.

Alternate Embodiment of the Status Indicator/Lock-Out Means of the Film Cassette FIG. 22 depicts an alternate embodiment of the indicator/lock-out means 101 in which, instead of the beveled-edge indicator portion 121 having contrasting colors, they are the same color and an indicator tab 301 is located adjacent the beveled-edge indicator portion. The indicator tab 301 as shown in FIG. 22 is not visible when the indicator/lock-out means 101 is in its unexposed position. When the indicator/lock-out means 101 is in its partly exposed position, the indicator tab 301 is only visible in the indicator window 107. When the indicator/lock-out means 101 is in its fully exposed position, the indicator tab 301 is only visible in the indicator window 109.

The invention has been described with reference to a preferred embodiment. However, it will be appreciated that variations and modifications can be effected within the ordinary skill in the art without departing from the scope of the invention. For example, the label 103 could include indicia "UNEXP" indicating that the filmstrip F is unexposed, and the end cap 105 could have another indicator window aligned with the indicia "UNEXP" for revealing the beleved-edge indicator portion 119 at that window when the indicator/lock-out means 101 is in its unexposed position.

We claim:

1. A film cassette comprising a film spool supported inside a lighttight cassette shell for rotation to thrust a filmstrip coiled about said spool to the exterior of said shell whether said filmstrip is unexposed or is only partly exposed, and a film exposure status indicator supported for movement relative to said shell from an unexposed position to respective partly exposed and fully exposed positions for providing visible indications that said filmstrip is only partly exposed or is substantially exposed is characterized in that:

said shell includes respective indicia indicating that said filmstrip is only partly exposed and is substantially exposed and respective windows located proximate said indicia; and said status indicator is configured in relation to said windows to be visible at the window proximate the indicia indicating that said filmstrip is only partly exposed when the indicator is in its partly exposed position and to be visible at the window proximate the indicia indicating that the filmstrip is substantially exposed when the indicator is in its fully exposed position.

2. A film cassette as recited in claim 1, wherein said status indicator is configured in relation to said windows to be visible at the window proximate the indicia indicating that said filmstrip is only partly exposed but not at the window proximate the indicia indicating that the filmstrip is substantially exposed when the indicator is in its partly exposed position and to be visible at each of the windows when the indicator is in its fully exposed position.

3. A film cassette as recited in claim 1 or 2, wherein said spool is supported for rotation to return said filmstrip to the interior of said shell, and said status indicator is fixed to said spool for rotation simultaneously with the spool to move to the window proximate the indicia indicating that said filmstrip is only partly exposed and to the window proximate the indicia indicating that the filmstrip is substantially exposed when the spool is rotated to return the filmstrip to the interior of said shell.

4. A film cassette as recited in claim 1, wherein said status indicator is configured in relation to said windows to be visible alternatively at the window proximate the indicia indicating that said filmstrip is only partly exposed when the indicator is in its partly exposed position and at the window proximate the indicia indicating that the filmstrip is substantially exposed when the indicator is in its fully exposed position.

5. A film cassette as recited in claim 1, wherein said shell includes an integral portion bridging said windows to cover said status indicator during movement of the indicator between its partly exposed and fully exposed positions.

6. A film cassette comprising a film spool supported inside a lighttight cassette shell for rotation to thrust a filmstrip coiled about said spool to the exterior of said shell whether said filmstrip is unexposed or is only partly exposed, and a film exposure status indicator supported for movement relative to said shell from an unexposed position to respective partly exposed and fully exposed positions for providing visible indicators that said filmstrip is only partly exposed or is substantially exposed, is characterized in that:

said shell is adapted to cover said status indicator to prevent the indicator from being seen and includes respective windows for revealing the indicator alternatively when the indicator is in its partly exposed and fully exposed positions but not revealing the indicator during movement of the indicator between the partly exposed and fully exposed positions.

7. A film cassette comprising a film spool supported inside a lighttight cassette shell for rotation to thrust a filmstrip coiled about said spool to the exterior of said shell whether said filmstrip is unexposed or is only partly exposed, and a film exposure status indicator supported for rotation relative to said shell from an unexposed position to respective partly exposed and fully exposed positions for providing visible indications that said filmstrip is only partly exposed or is substantially exposed, is characterized in that:

said shell includes cover means for concealing said status indicator except when the indicator is in its partly exposed and fully exposed positions to allow the indicator to be seen only in those two positions.

8. A film cassette as recited in claim 7, wherein said shell includes respective windows for revealing said status indicator alternatively when the indicator is in its partly exposed and fully exposed positions.

9. A film cassette as recited in claim 7, wherein said shell includes respective windows for revealing said status indicator when the indicator is in its partly exposed and fully exposed positions, and said status indicator is configured in relation to said windows to be visible at only one of the windows when the indicator is in its partly exposed position and to be visible at each of the windows when the indicator is in its fully exposed position.

* * * * *